US007941545B2

(12) United States Patent
Bayus et al.

(10) Patent No.: US 7,941,545 B2
(45) Date of Patent: May 10, 2011

(54) SYSTEM AND ARTICLE OF MANUFACTURE FOR ESTABLISHING AND REQUESTING STATUS ON A COMPUTATIONAL RESOURCE

(75) Inventors: Mark Steven Bayus, Tucson, AZ (US); Roger Gregory Hathorn, Tucson, AZ (US); Bret Wayne Holley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 12/101,092

(22) Filed: Apr. 10, 2008

(65) Prior Publication Data

US 2008/0215741 A1 Sep. 4, 2008

Related U.S. Application Data

(63) Continuation of application No. 10/231,396, filed on Aug. 29, 2002, now Pat. No. 7,395,337.

(51) Int. Cl.
  *G06F 15/16* (2006.01)
(52) U.S. Cl. .......................................... 709/227; 709/228
(58) Field of Classification Search .......... 709/227–228; 710/36–39; 711/100
  See application file for complete search history.

(56) References Cited

U.S. PATENT DOCUMENTS

| 4,939,735 A | 7/1990 | Fredericks et al. |
| 5,097,410 A | 3/1992 | Hester et al. |
| 5,121,390 A | 6/1992 | Farrell et al. |
| 5,548,743 A | 8/1996 | Sugiyama et al. |
| 5,944,838 A * | 8/1999 | Jantz ................................. 714/6 |
| 6,336,193 B1 | 1/2002 | Yudenfriend et al. |
| 6,338,145 B1 | 1/2002 | Yudenfriend et al. |
| 6,338,151 B1 | 1/2002 | Yudenfriend et al. |
| 6,349,350 B1 * | 2/2002 | Hathorn et al. ................. 710/36 |
| 6,829,659 B2 | 12/2004 | Beardsley et al. |
| 6,907,451 B1 | 6/2005 | Mukundan et al. |
| 6,944,707 B2 | 9/2005 | Furuumi et al. |
| 2002/0141427 A1 * | 10/2002 | McAlpine ..................... 370/413 |
| 2002/0152338 A1 | 10/2002 | Elliott et al. |
| 2003/0126321 A1 | 7/2003 | Sinha |
| 2003/0217092 A1 | 11/2003 | Veselov |

FOREIGN PATENT DOCUMENTS

JP   6128165   12/1986

(Continued)

OTHER PUBLICATIONS

"Error Sympton Code Generator for a Storage System", IBM Corp., Technical Disclosure Bulletin, vol. 15, No. 3, Aug. 1972, pp. 799-800a.

(Continued)

*Primary Examiner* — Salad Abdullahi
(74) *Attorney, Agent, or Firm* — David W. Victor; Konrad Raynes & Victor LLP (57) ABSTRACT

Provided are a system and article of manufacture for establishing and requesting status on a computational resource. An operation is performed to establish a computational resource, wherein the computational resource is not available until the establish operation is completed. A determination is made as to whether a status request to determine status of the computational resource is pending before the establish operation has completed. Indication is made to resubmit the status request if there is a status request for the computational resource pending before the establish operation has completed.

20 Claims, 4 Drawing Sheets

FOREIGN PATENT DOCUMENTS

WO 0113584 2/2001

OTHER PUBLICATIONS

"Link Access D-Channel Protocol Processor for Integrated Service Digital Network Data Link Control", IBM Corp., Technical Disclosure Bulletin, vol. 34, No. 10A, Mar. 1992, pp. 333-338.

"Tracing Hardware for a Multiplexed Interface", IBM Corp., Technical Disclosure Bulletin, vol. 38, No. 11, Nov. 1995, pp. 419-420.

Z.L. Shi, et al., "Design of Robust Packet Synchronization Using Standard VLSI Input/Output Devices in Packet Radio Communication", IEEE Pacific Rim Conference on Communications, Computers, and Signal Processing, May 1991, pp. 749-752.

* cited by examiner

SYSTEM AND ARTICLE OF MANUFACTURE FOR ESTABLISHING AND REQUESTING STATUS ON A COMPUTATIONAL RESOURCE

CROSS-REFERENCE TO RELATED APPLICATION

This application is a continuation application of U.S. patent application Ser. No. 10/231,396, filed on Aug. 29, 2002, the disclosure of which is incorporated herein by reference in its entirety.

BACKGROUND OF THE INVENTION

1. Field of the Invention

The present invention relates to a system and article of manufacture for establishing and requesting status on a computational resource.

2. Description of the Related Art

Computing systems often include one or more host computers ("hosts") for processing data and running application programs, direct access storage devices (DASDs) for storing data, and a storage controller for controlling the transfer of data between the hosts and the DASD. In operating systems that conform to the International Business Machines Corporation ("IBM") Enterprise Systems Architecture (ESA) 360, 370, and 390 architectures, the storage controller, also referred to as a control unit or storage director, manages access to a storage space comprised of numerous hard disk drives connected in a loop architecture, otherwise referred to as a Direct Access Storage Device (DASD).

Hosts may communicate with the storage controller through logical paths also referred to as host channels, where there may be one or more logical paths for each physical communication path between a host port and storage controller port. Both the host and the storage controller must maintain a consistent view of their logical paths to avoid communication errors. However, situations may arise where the host and storage controller views of the logical paths differ. In such situations, the host may issue an Input/Output (I/O) request down a channel or logical path that the host believes exists, but that the storage controller does not recognize. In such case, an interface controller error would occur due to this inconsistent view of the logical path states between the controller and host.

For these reasons, there is a need in the art to provide techniques for ensuring that the host and storage controller maintain a consistent view of logical paths therebetween to avoid communication errors that result from inconsistent views.

SUMMARY OF THE DESCRIBED IMPLEMENTATIONS

Provided are a method, system, and program for establishing and requesting status on a computational resource. An operation is performed to establish a computational resource, wherein the computational resource is not available until the establish operation is completed. A determination is made as to whether a status request to determine status of the computational resource is pending before the establish operation has completed. Indication is made to resubmit the status request if there is a status request for the computational resource pending before the establish operation has completed.

In further implementations, a response is received to the status request and a determination is made on whether resubmit is indicated for the status request. The response to the status request is disregarded if the resubmit is indicated.

Still further, the computational resource may comprise a logical path between a host and server, wherein the host initiates the operation to establish the logical path, and wherein the server performs the operation to establish the logical path and initiates the status request.

Further provided are a method, system, and program for establishing and requesting status on a computational resource. A status request is processed to determine status of the computational resource. A determination is made on whether an establish operation is pending to establish the computational resource, wherein the computational resource is not available until the establish operation is completed. The status request is queued if the establish operation for the computational resource is pending.

In further implementations, a response is received to the status request and a determination is made as to whether the status request was pending when the establish operation to establish the computational resource was pending. The response to the status request is disregarded if the status request was pending at the same time as the establish operation for the computational resource.

Described implementations provide techniques to handle conflicts that may occur between an operation to establish a computational resource and an operation to determine the status of the computational resource. For instance, described implementations may maintain consistency to prevent conflicts that occur when the host and storage controller have inconsistent views of the availability of a channel or logical path.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Inconsistent Logical Paths in the Prior Art

In prior art systems, an inconsistent logical path state can occur when the storage controller issues a test initialization (TIN) to query the host if a particular logical path is available while the host is attempting to establish the same logical path to the storage controller. For instance, in a first prior art scenario, if the host issues a command to establish a logical path (ELP) and the storage controller sends a TIN to test the same logical path, then the host may receive the logical path established (LPE) message from the storage controller (indicating that the requested logical path was established in response to the ELP request) after sending a response to the TIN request. The response to the TIN request may be in the form of a Test Initialization Response (TIR) that indicates whether the host recognizes the logical path. The negative TIR is sent even after a path is established if the host does not receive the LPE indicating the establishment of the path before sending the negative TIR. Upon receiving the negative TIR, the storage controller may remove the logical path just established. Any attempts by the host to communicate down the logical the host believes was established due to receiving the LPE would fail because the storage controller, due to the negative TIR, does not recognize the existence of the logical path.

In a second prior art scenario, that is a variant of the first, after the storage controller sends the TIN and the host sends the ELP, the host may return the negative TIR before receiving the LPE indicating that the storage controller created the requested logical path. In such case, the storage controller would abort the ELP to produce an interface error. The host must then resend the ELP to reestablish a logical path on the channel.

In a third prior art scenario, the storage controller may send the TIN to test a logical path before the host sends the ELP to establish the logical path. If the storage controller establishes the logical path and returns the LPE to the host, then the host may return a negative TIR indicating that there is no such logical path before receiving the LPE from the storage controller. In such case, the storage controller would terminate the logical path and not recognize its presence, while the host would recognize the logical path due to receiving the LPE. In such case, errors would occur when the host attempts to use the logical path that the storage controller no longer recognizes.

Described implementations provide techniques to avoid an inconsistent logical path state that sometimes occurs in the prior art when a storage controller TIN and host ELP are concurrently pending.

Establishing Logical Paths to Avoid Inconsistent States

Figure 1:
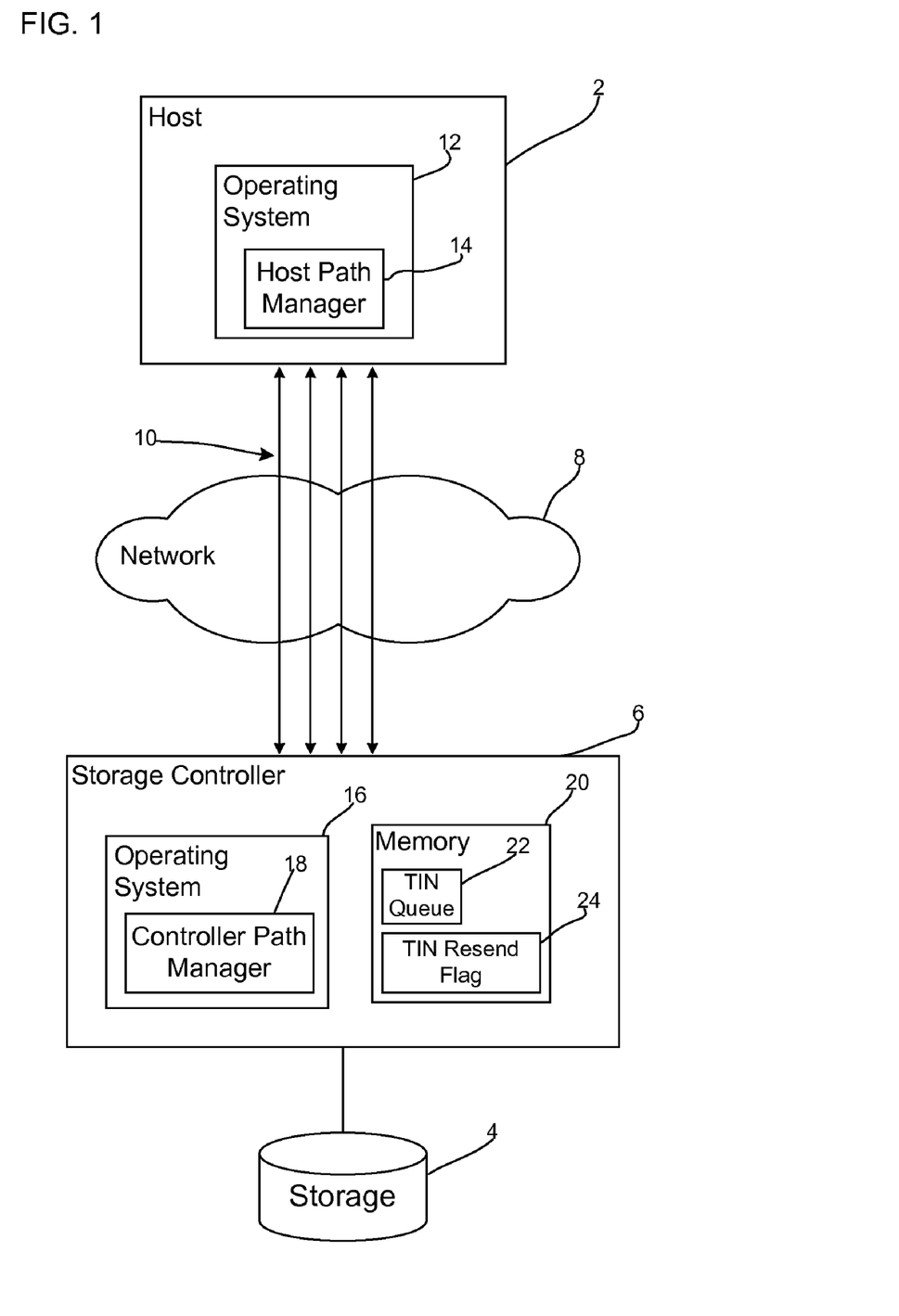
FIG. 1 illustrates a computing environment in which aspects of the invention are implemented.

FIG. 1 illustrates a computer architecture in which aspects of the invention are implemented. One or more hosts 2 are in data communication with a storage system 4, such as a DASD or any other storage system known in the art, via a storage controller 6. The host 2 may be any computing device known in the art, such as a server, mainframe, workstation, personal computer, hand held computer, laptop, telephony device, etc. The storage controller 6 and host system(s) 2 communicate via a network 8, which may comprise a Storage Area Network (SAN), Local Area Network (LAN), Intranet, the Internet, Wide Area Network (WAN), etc. The storage system 4 may be comprised of hard disk drives, tape cartridge libraries, optical disks, or any suitable non-volatile storage medium known in the art. The storage system 4 may be arranged as an array of storage devices, such as a Just a Bunch of Disks (JBOD), DASD, Redundant Array of Independent Disks (RAID) array, virtualization device, etc. The storage controller 6 may comprise any storage controller or server known in the art, such as the IBM Enterprise Storage Server (ESS).**

In certain implementations, both the host 2 and storage controller 6 may have multiple ports to provide multiple physical paths (not shown) to enable communication over the network 8. The host 2 and storage controller 6 may also configure multiple logical paths 10 that are used to provide communication between the host 2 and storage controller 6, where the host can issue I/O requests to the storage 4 over the logical paths 10 to the storage controller 6. Logical path 10 refers to one or more of the logical paths between the host 2 and storage controller 6 that are implemented over one or more physical paths therebetween.

The host 2 includes an operating system 12 that has a host path manager 14 component to manage the logical paths between the host 2 to the controller. The storage controller 6 also includes an operating system 16 that has a controller path manager 18 to manage the logical paths to the host 2. As discussed, the storage controller may issue a TIN (test initiative) command to test whether a specified logical path is available. If the host 2 recognizes the specified logical path 10, then the host path manager 14 returns a positive TIR (test initiative response), else the host path manager 14 returns a negative TIR. The host path manager 14 may issue an ELP (establish logical path) command to establish a specified logical path. This causes the storage controller path manager 18 to create the requested logical path and return a LPE (logical path established) message to the requesting host path manager 14 indicating the creation and availability of the requested logical path 10.

The storage controller memory 20, which may comprise volatile memory or non-volatile storage, includes a TIN queue 22 in which the controller path manager 18 may queue TIN requests and access and submit TIN requests from the queue 22. The TIN queue 22 may queue TIN requests for different logical paths 10. A TIN resend flag 24 is used to indicate to the controller path manager 18 to resend a TIN request due to a pending ELP command that may render the TIR response irrelevant, e.g., such as the case if the TIR response is sent by the host before the host learns that the logical path was established through receiving the LPE notification.

Figure 2:
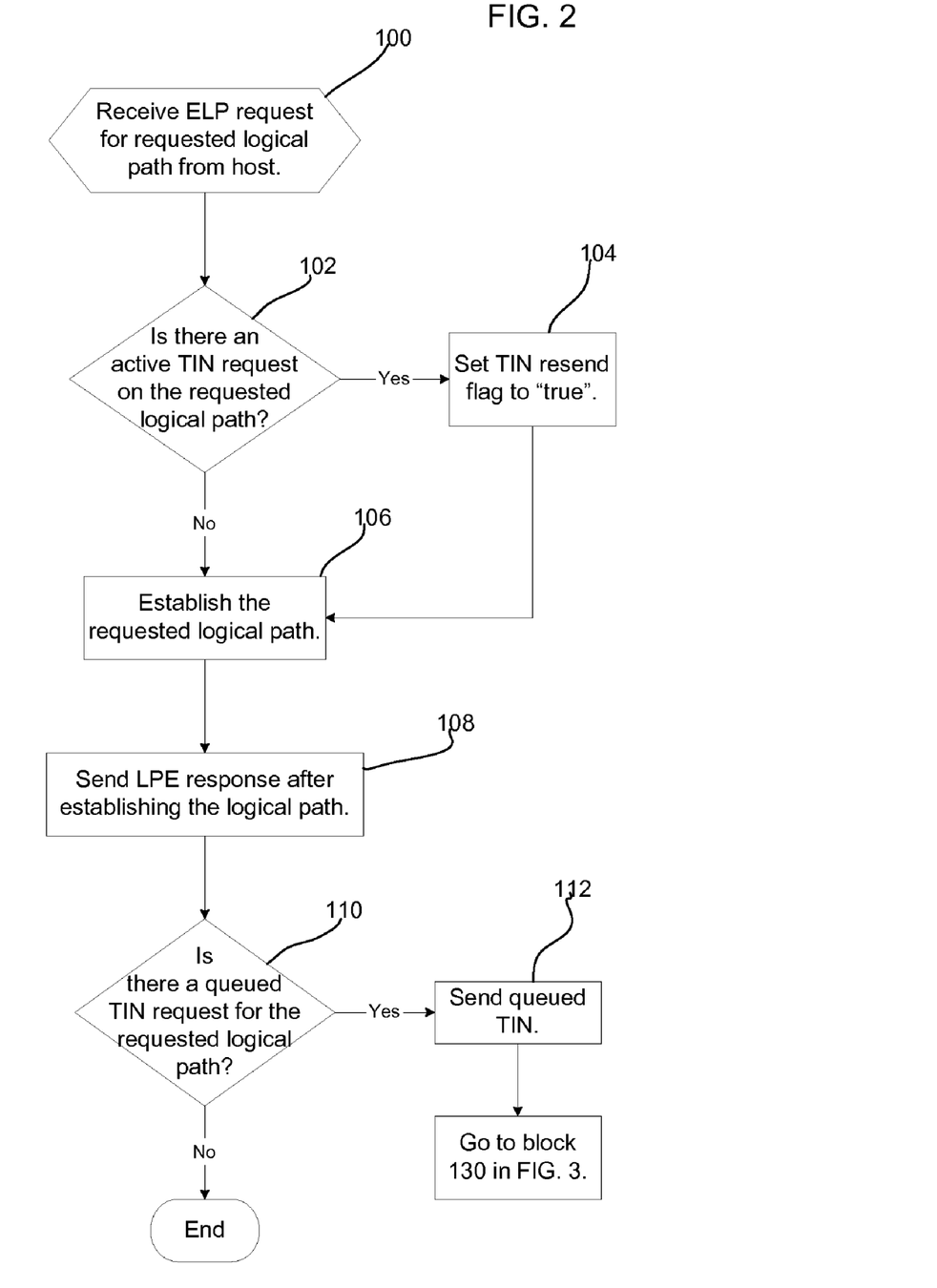
FIGS. 2 and 3 illustrate logic to manage requests to establish a logical path and requests for status on a logical path in accordance with implementations of the invention.
Figure 3:
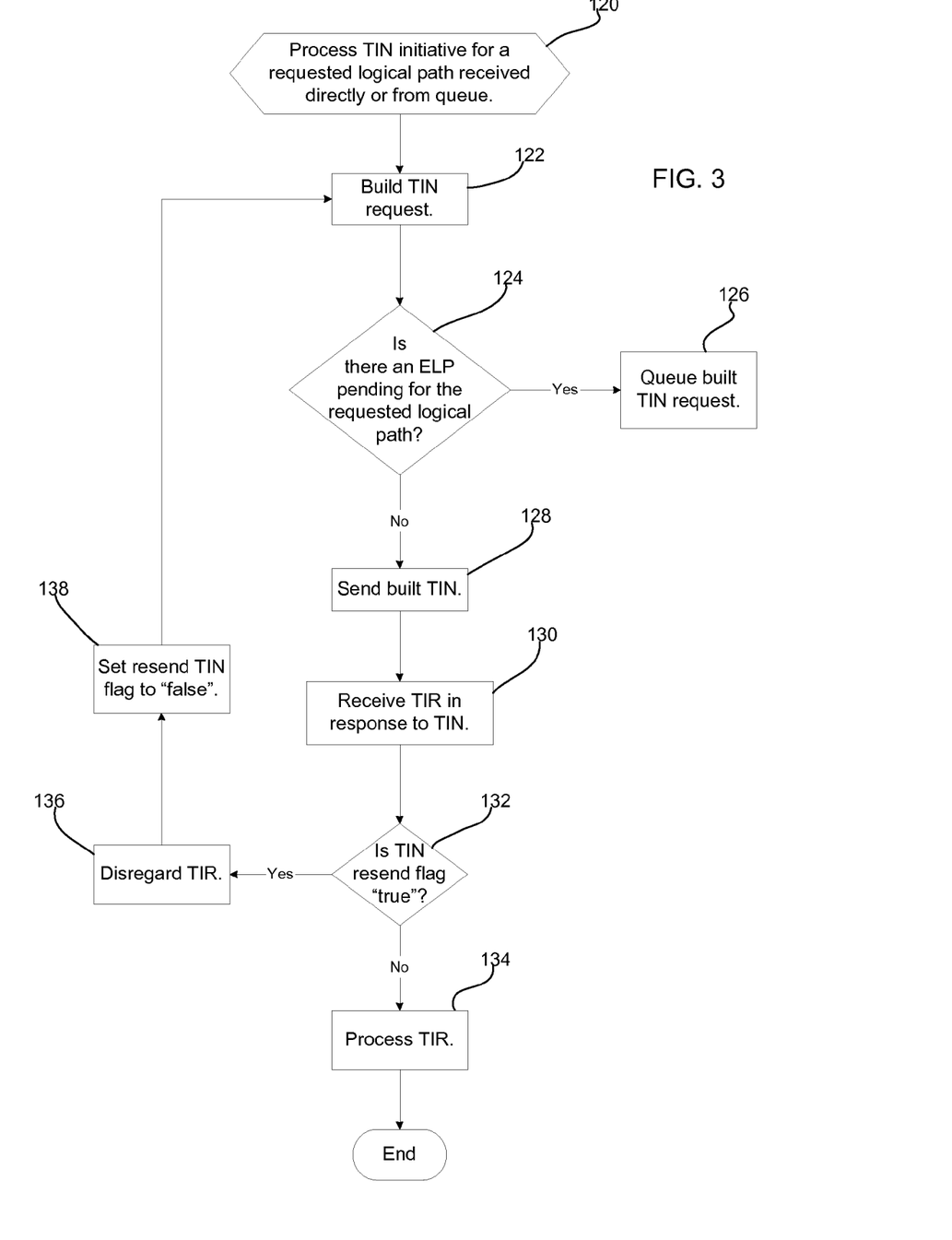

FIGS. 2 and 3 illustrate logic implemented in the controller path manager 18 to handle ELP and TIN requests, respectively, in a manner that avoids inconsistent logical path states, such as occur in the prior art scenarios discussed above. With respect to FIG. 2, control begins at block 100 when the controller path manager 18 receives an ELP for a requested logical path from the host 2. If (at block 102) there is an active TIN request pending on the requested logical path 10, then the TIN resend flag 24 is set (at block 104) to "true". A TIN request is active if the controller path manager 18 submitted the TIN request and has not yet received a TIR. From block 104 or the no branch of block 102, the controller path manager 18 starts the operations to establish (at block 106) the requested logical path and sends (at block 108) the LPE message to the requesting host 2 after establishing the logical path 10. If (at block 110) there is a queued TIN request in the TIN queue 22 for the logical path established at block 106, then the queued TIN is sent (at block 112); otherwise, control ends.

With respect to FIG. 3, control begins at block 120 when the controller path manager 18 receives a TIN initiative for a requested logical path, where the TIN initiative is an invocation to create a TIN. As discussed, TIN initiatives may be generated when the controller path manager 18 detects a state change event notification indicating some change in the network 8 and/or logical paths 10. In response to processing the TIN initiative, the controller path manager 18 would build (at block 122) the TIN by submitting a TIN request. If (at block 124) there is an ELP pending on the logical path 10 subject to the TIN request, then the TIN request is queued (at block 126) in the TIN queue 22 and would be later processed after the ELP request completes. Otherwise, if (at block 124) there is no pending ELP request, then the controller path manager 18 sends (at block 128) the built TIN request to the host 2 to determine the status of the logical path 10. Upon receiving (at block 130) the TIR response to the sent TIN request, the controller path manager 18 determines (at block 132) whether the TIN resend flag 24 is "true". If so, then the TIR is disregarded (at block 136) because the host path manager 14 may have generated the TIR prior to having knowledge of the existence of the logical path, e.g., if the host path manager 14 sent the TIR before sending the ELP or after sending the ELP but before receiving the LPE. In such situations, the TIR may indicate no existing logical path when in fact a logical path may have been established after the TIR was sent. When disregarding the TIR, the resend TIN flag 24 is set to "false" and control proceeds back to block 122 to rebuild a TIN request for the logical path 10 to resend. Any TIR response to the resent TIN request would indicate the existence of a logical path created by the intervening ELP.

If (at block 132) the resend TIN flag 24 is "false", then the controller path manager 18 processes (at block 134) TIR because if the resend TIN flag 24 is false, there would have been no intervening ELP that could have created the logical path after the negative TIR was sent by the host path manager 14.

The described implementations provide techniques for handling both requests to establish a resource, such as a logical path, and requests for the status of a resource, such as a TIN request, to ensure that the response to the status request is accurate and is not outdated by the establishment of the resource after the response to the status request is returned indicating the absence of the resource soon to be established.

Additional Implementation Details

The described techniques for managing the establishment and status checking of resources may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, the status request (TIN) and establishment command (ELP) were performed with respect to logical paths between a host and storage controller. In alternative implementations, the computational resource subject to the status requests and establishment operations may comprise computational resources other than a logical path between a host and storage controller, such as a logical storage unit, physical path, etc. Further, the test and establishment operations described as performed between a host and storage controller may not occur between a host and storage as described with certain implementations, but may occur locally at a single computational system. For instance, the establishment operations may establish a logical device, such as a logical storage unit, logical printer, etc., without regard to any client or server communication over a network.

In described implementations, the host and storage used an ELP and TIN commands to establish and determine status concerning logical paths. In alternative network storage implementations, other commands may be used to establish a logical path between a client and server and determine the status of a path between the client and server.

Figure 4:
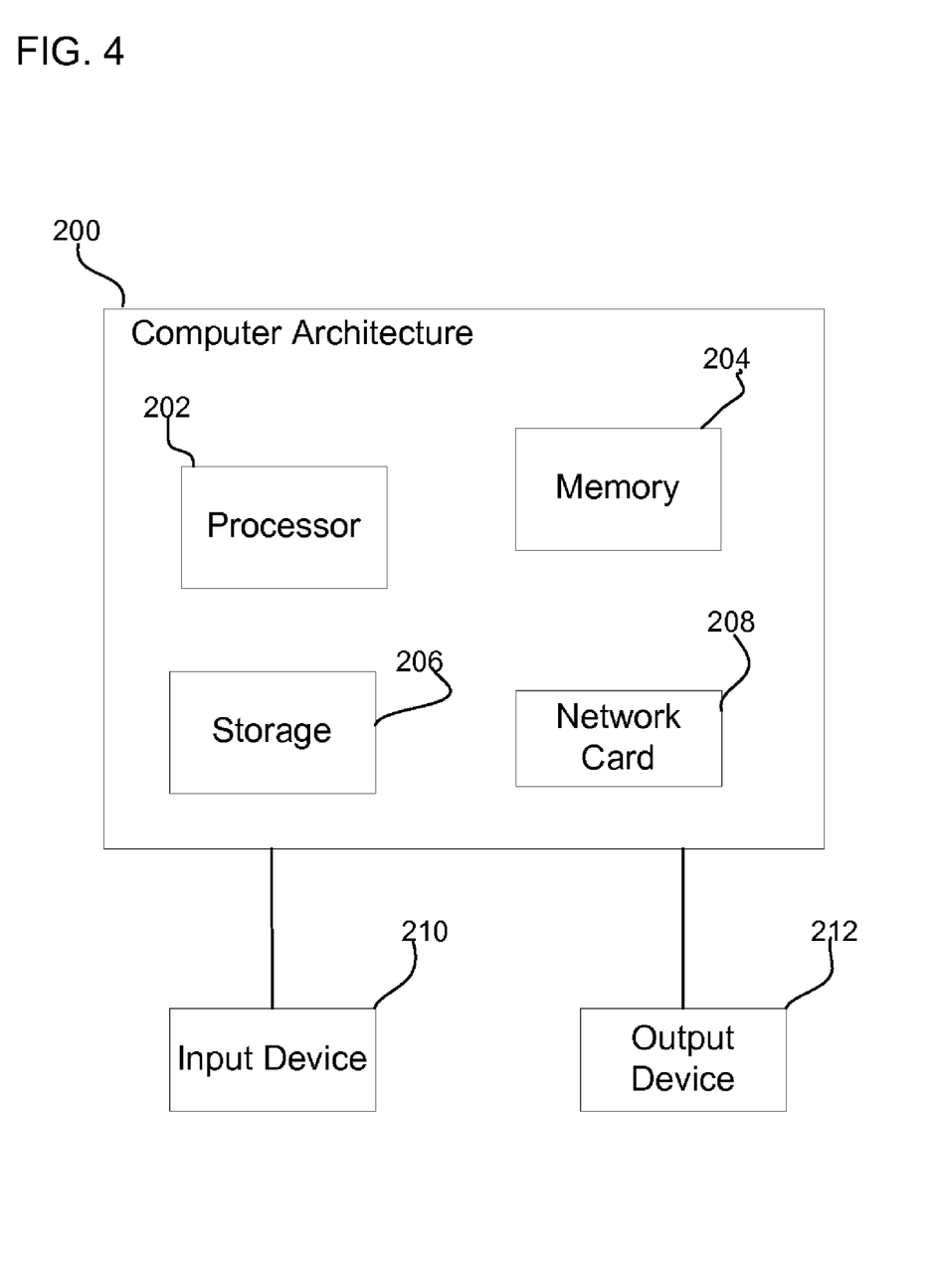
FIG. 4 illustrates an architecture of computing components in the network environment, such as the hosts and storage controller, and any other computing devices.

The illustrated logic of FIGS. 3 and 4 shows certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

FIG. 4 illustrates one implementation of a computer architecture 200 of the network components, such as the host and storage controller shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system comprising a server in communication with a host for establishing a logical path between the host and the server and requesting status, comprising:

a path manager to perform operations, the operations comprising:

performing an operation to establish the logical path, wherein the logical path is not available until the establish operation is completed;

receiving a status request for the logical path while the establish operation is pending, wherein the host initiates the operation to establish the logical path, and wherein the server performs the operation to establish the logical path and initiates the status request;

determining whether a status request to determine status of the logical path is pending before the establish operation has completed;

queuing the received status request for the logical path while the establish operation for the logical path is pending;

indicating to resubmit the status request if there is a status request for the logical path pending before the establish operation has completed; and submitting the queued status request for the logical path after completing the establish operation for the logical path.

2. The system of claim 1, wherein the operations further comprise:

receiving a response to the status request;

determining whether resubmit is indicated for the status request; and disregarding the response to the status request if the resubmit is indicated.

3. The system of claim 2, wherein the operations further comprise:

resending the status request for the logical path after disregarding the response.

4. The system of claim 1, wherein the operations further comprise:

transmitting a path established message to the host after completing the establish of the logical path; and issuing any queued status request for the logical path after transmitting the path established message.

5. The system of claim 4, wherein the operations further comprise:

receiving a response to the status request;

determining whether resubmit is indicated for the status request;

disregarding the response to the status request if the resubmit is indicated; and resending the status request for which resubmit is indicated.

6. A system comprising a server in communication with a host for establishing a logical path between the host and the server and requesting status, comprising:

a path manager to perform operations, the operations comprising:

processing a status request to determine status of the logical path while an establish operation is pending, wherein the host initiates the operation to establish the logical path, and wherein the path manager performs the operation to establish the logical path and initiates the status request;

determining whether an establish operation is pending to establish the logical path, wherein the logical path is not available until the establish operation is completed;

queuing the status request if the establish operation for the logical path is pending; and submitting the queued status request for the logical path after completing the establish operation for the logical path.

7. The system of claim 6, wherein the operations further comprise:

receiving a response to the status request;

determining whether the status request was pending when the establish operation to establish the logical path was pending; and disregarding the response to the status request if the status request was pending at the same time as the establish operation for the logical path.

8. The system of claim 7, wherein the operations further comprise:

resending the status request for the logical path if the response is disregarded.

9. The system of claim 7, wherein the determining of whether the status request was pending when an establish operation to establish the logical path was pending comprises:

setting a resubmit flag to indicate to resubmit the status request if the establish operation for the logical path is received while the status request for the logical path is pending.

10. The system of claim 6, wherein the operations further comprise:

detecting a change in a network through which the host and server communicate, wherein the server includes the means for initiating the status request in response to detecting the change in the network.

11. An article of manufacture comprising a computer readable storage device having code executed to establish and request status on a logical path between a host and server and perform operations, the operations comprising:

performing an operation to establish the logical path between the host and the server, wherein the logical path is not available until the establish operation is completed;

receiving a status request for the logical path while the establish operation is pending, wherein the host initiates the operation to establish the logical path, and wherein the server performs the operation to establish the logical path and initiates the status request;

determining whether a status request to determine status of the logical path is pending before the establish operation has completed;

queuing the received status request for the logical path while the establish operation for the logical path is pending;

indicating to resubmit the status request if there is a status request for the logical path pending before the establish operation has completed; and submitting the queued status request for the logical path after completing the establish operation for the logical path.

12. The article of manufacture of claim 11, wherein the operations further comprise:

receiving a response to the status request;

determining whether resubmit is indicated for the status request; and disregarding the response to the status request if the resubmit is indicated.

13. The article of manufacture of claim 12, wherein the operations further comprise:

resending the status request for the logical path after disregarding the response.

14. The article of manufacture of claim 11, wherein the operations further comprise:

transmitting a path established message to the host after completing the establish of the logical path; and issuing any queued status request for the logical path after transmitting the path established message.

15. The article of manufacture of claim 14, wherein the operations further comprise:
receiving a response to the status request;
determining whether resubmit is indicated for the status request;
disregarding the response to the status request if the resubmit is indicated; and
resending the status request for which resubmit is indicated.

16. An article of manufacture comprising a computer readable storage device having code executed to establish and request status on a logical path between a host and server and perform operations, the operations comprising:
processing a status request to determine status of the logical path while an establish operation is pending, wherein the host initiates the operation to establish the logical path, and wherein the server performs the operation to establish the logical path and initiates the status request;
determining whether an establish operation is pending to establish the logical path, wherein the logical path is not available until the establish operation is completed;
queuing the status request if the establish operation for the logical path is pending; and
submitting the queued status request for the logical path after completing the establish operation for the logical path.

17. The article of manufacture of claim 16, wherein the operations further comprise:
receiving a response to the status request;
determining whether the status request was pending when the establish operation to establish the logical path was pending; and
disregarding the response to the status request if the status request was pending at the same time as the establish operation for the logical path.

18. The article of manufacture of claim 17, wherein the operations further comprise:
resending the status request for the logical path if the response is disregarded.

19. The article of manufacture of claim 17, wherein determining whether the status request was pending when an establish operation to establish the logical path was pending comprises:
setting a resubmit flag to indicate to resubmit the status request if the establish operation for the logical path is received while the status request for the logical path is pending.

20. The article of manufacture of claim 17, wherein the operations further comprise:
detecting a change in a network through which the host and server communicate, wherein the server initiates the status request in response to detecting the change in the network.

\* \* \* \* \*